United States Patent
Niu et al.

(10) Patent No.: US 11,909,666 B2
(45) Date of Patent: Feb. 20, 2024

(54) METHODS AND SYSTEMS FOR RESOURCE OPTIMIZATION

(71) Applicant: Arista Networks, Inc., Santa Clara, CA (US)

(72) Inventors: Binglai Niu, Surrey (CA); Mayukh Saubhasik, Richmond (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/991,170

(22) Filed: Nov. 21, 2022

(65) Prior Publication Data

US 2023/0084395 A1   Mar. 16, 2023

Related U.S. Application Data

(63) Continuation of application No. 17/528,671, filed on Nov. 17, 2021, now Pat. No. 11,533,273, which is a continuation of application No. 16/833,382, filed on Mar. 27, 2020, now Pat. No. 11,196,679.

(51) Int. Cl.
| | |
|---|---|
| *H04L 47/70* | (2022.01) |
| *G06F 3/06* | (2006.01) |
| *H04L 45/24* | (2022.01) |
| *H04L 45/00* | (2022.01) |

(52) U.S. Cl.
CPC .............. *H04L 47/82* (2013.01); *G06F 3/067* (2013.01); *G06F 3/0608* (2013.01); *G06F 3/0631* (2013.01); *H04L 45/24* (2013.01); *H04L 45/245* (2013.01); *H04L 45/34* (2013.01)

(58) Field of Classification Search
CPC ...... G06F 3/0608; G06F 3/0631; G06F 3/067; H04L 45/24; H04L 45/245; H04L 45/34; H04L 47/82
See application file for complete search history.

(56) References Cited

U.S. PATENT DOCUMENTS

| | | | |
|---|---|---|---|
| 8,352,954 B2 * | 1/2013 | Gokhale | ............... G06F 9/5016 718/105 |
| 2016/0006668 A1 * | 1/2016 | Shibayama | ......... H04L 67/1097 709/226 |

OTHER PUBLICATIONS

Han Bin et al. "Machine Learning for Network Slicing Resource Management: A Comprehensive Survey", Sep. 2019, 8 pages. (Year: 2019).*

(Continued)

*Primary Examiner* — George C Neurauter, Jr.
(74) *Attorney, Agent, or Firm* — Sprinkle IP Law Group (57) ABSTRACT

A method for optimizing network device resources that includes receiving, by an optimizer, first resource utilization data, making a first determination, based on the first resource utilization data, that resource utilization exceeds an upper threshold, starting, based on the first determination, an optimization process, that includes identifying a resource optimization entry of a resource class optimization queue, and initiating optimization of a resource fragment specified by the resource optimization entry. After initiating optimization of the region of the memory, the method additionally includes receiving second resource utilization data, making a second determination, based on the second resource utilization data, that the resource utilization is below a lower threshold, and halting, based on the second determination, the optimization process.

20 Claims, 8 Drawing Sheets

(56) References Cited

OTHER PUBLICATIONS

Matías Richart et al. "Resource Slicing in Virtual Wireless Networks: A Survey", IEEE Transactions on Network and Service Management, vol. 13, No. 3, Sep. 2016, 15 pages. (Year: 2016).*

* cited by examiner

METHODS AND SYSTEMS FOR RESOURCE OPTIMIZATION

CROSS-REFERENCE TO RELATED APPLICATION(S)

This application is a continuation of, and claims a benefit of priority under 35 U.S.C. 120 from, U.S. patent application Ser. No. 17/528,671, filed Nov. 17, 2021, issued as U.S. Pat. No. 11,533,273, entitled "METHODS AND SYSTEMS FOR RESOURCE OPTIMIZATION," which claims a benefit of priority under 35 U.S.C. 120 from, U.S. patent application Ser. No. 16/833,382, filed Mar. 27, 2020, issued as U.S. Pat. No. 11,196,679, entitled "METHODS AND SYSTEMS FOR RESOURCE OPTIMIZATION." All applications listed in this paragraph are fully incorporated by reference herein for all purposes.

BACKGROUND

Over utilization of shared resources within a network device may deprive certain processes from their usage and lower the efficiency of the network device. In such scenarios, it may be desirable to adapt one or more systems to enhance the functionalities of devices and/or components to optimize the utilization of shared resources.

SUMMARY

In general, in one aspect, embodiments relate to a method for optimizing network device resources that includes receiving, by an optimizer, first resource utilization data, making a first determination, based on the first resource utilization data, that resource utilization exceeds an upper threshold, starting, based on the first determination, an optimization process, that includes identifying a resource optimization entry of a resource class optimization queue, and initiating optimization of a resource fragment specified by the resource optimization entry where, after initiating optimization of the resource fragment, the process includes receiving second resource utilization data, making a second determination, based on the second resource utilization data, that the resource utilization is below a lower threshold, and halting, based on the second determination, the optimization process.

In general, in one aspect, embodiments relate to a network device, that includes memory, and a processor, wherein the processor is configured to perform a method for optimizing network device resources that includes receiving, by an optimizer, first resource utilization data, making a first determination, based on the first resource utilization data, that resource utilization exceeds an upper threshold, starting, based on the first determination, an optimization process, that includes identifying a resource optimization entry of a resource class optimization queue, and initiating optimization of a resource fragment specified by the resource optimization entry where, after initiating optimization of the resource fragment, the process includes receiving second resource utilization data, making a second determination, based on the second resource utilization data, that the resource utilization is below a lower threshold, and halting, based on the second determination, the optimization process.

In general, in one aspect, embodiments relate to a network device, that includes memory, and a processor, wherein the processor is configured to perform a method for optimizing network device resources that includes receiving, by an optimizer, first resource utilization data, making a first determination, based on the first resource utilization data, that resource utilization exceeds an upper threshold, starting, based on the first determination, an optimization process, that includes identifying a resource optimization entry of a resource class optimization queue, and initiating optimization of a resource fragment specified by the resource optimization entry.

Other aspects will be apparent from the following description and the appended claims.

DETAILED DESCRIPTION

In a network device, underlying hardware resources may be allocated to one or more processes which, in turn, use those resources to process and/or maintain data. For example, when utilizing "equal-cost multi-path" (ECMP) techniques, an ECMP table may be generated in memory (i.e., a hardware resource of the network device) that includes entries associating one or more external network devices with a destination (i.e., a "network route"). However, as the network device continues to operate, processes may utilize an ever larger portion of hardware resources—often maintaining data corresponding to outdated, inactive, and/or redundant associations (e.g., "non-optimal network routes"). Thus, a problem arises when a significant portion of hardware resources are allocated to maintaining non-optimal network route associations, thereby depriving other processes of the use of those resources.

One method to reduce resource utilization may include selecting and releasing (i.e., de-allocating) hardware resources to enable their utilization by other processes of the network device. However, without intelligent selection of which resources to de-allocate, additional problems may arise and further hinder operation of the network device. One potential problem of arbitrary resource de-allocation is that if a regularly-used network route is disassociated with an ECMP table (e.g., the region of memory maintaining that association is de-allocated and/or overwritten, which is the resource in this example), the software managing that ECMP table may re-generate that same association, in memory, after the initial de-allocation. Accordingly, in such a scenario, the network device will have performed multiple unnecessary operations, which ultimately caused no increase in the overall availability of underlying hardware resources.

Accordingly, to more efficiently manage hardware resources, one or more embodiments described herein provides for actively tracking non-optimal network routes (e.g., routes that are underutilizing an association maintained by a resource) in an optimization queue. Then, if the overall network device resource utilization surpasses a "high threshold", an optimization process to "optimize" the network route(s) of the optimization queue is initiated. Generally, the optimization process includes (1) identifying a non-optimal network route entry from the optimization queue and, for that entry, (2) de-allocating the resource that maintains the association for that non-optimal route. Further, one embodiment provides that after a resource is freed for use, the overall network device resource utilization is re-measured and compared against a "low threshold" and, if the overall resource utilization falls below that low threshold, the optimization process is halted. Thus, by setting a "low threshold" to stop the optimization process, not all associations (of non-optimal routes) are necessarily de-allocated; rather, only a sufficient number of non-optimal routes are de-allocated to lower the utilization enough to halt the optimization process.

However, even when utilizing one or more of the disclosed embodiments, an allocation of resources may be labeled "non-optimal" prematurely based on short term data. For example, some network routes may appear slow or inactive for only a brief period before regaining stable connectivity. Thus, a potential problem arises when resources (allocated to an optimal network route association) are de-allocated based on a premature determination that the network route is "non-optimal". Accordingly, one embodiment provides that each non-optimal route entry is time-stamped when added to the optimization queue, where the timestamp may be utilized to ensure that a minimum amount of time elapses (e.g., a "waiting period", "minimum duration of time") before the associated resource is de-allocated. Thus, during that waiting period, if the route is correctly re-identified as 'optimal', the entry is removed from the optimization queue and the resource (where that association is maintained) is not de-allocated unnecessarily. Accordingly, by utilizing one or more embodiments disclosed herein, only the resources that are consistently maintaining non-optimal routes are de-allocated; and further, routes that may repeatedly change status between "optimal" and "non-optimal" (within the waiting period) are not repeatedly de-allocated and re-allocated.

Figure 1:
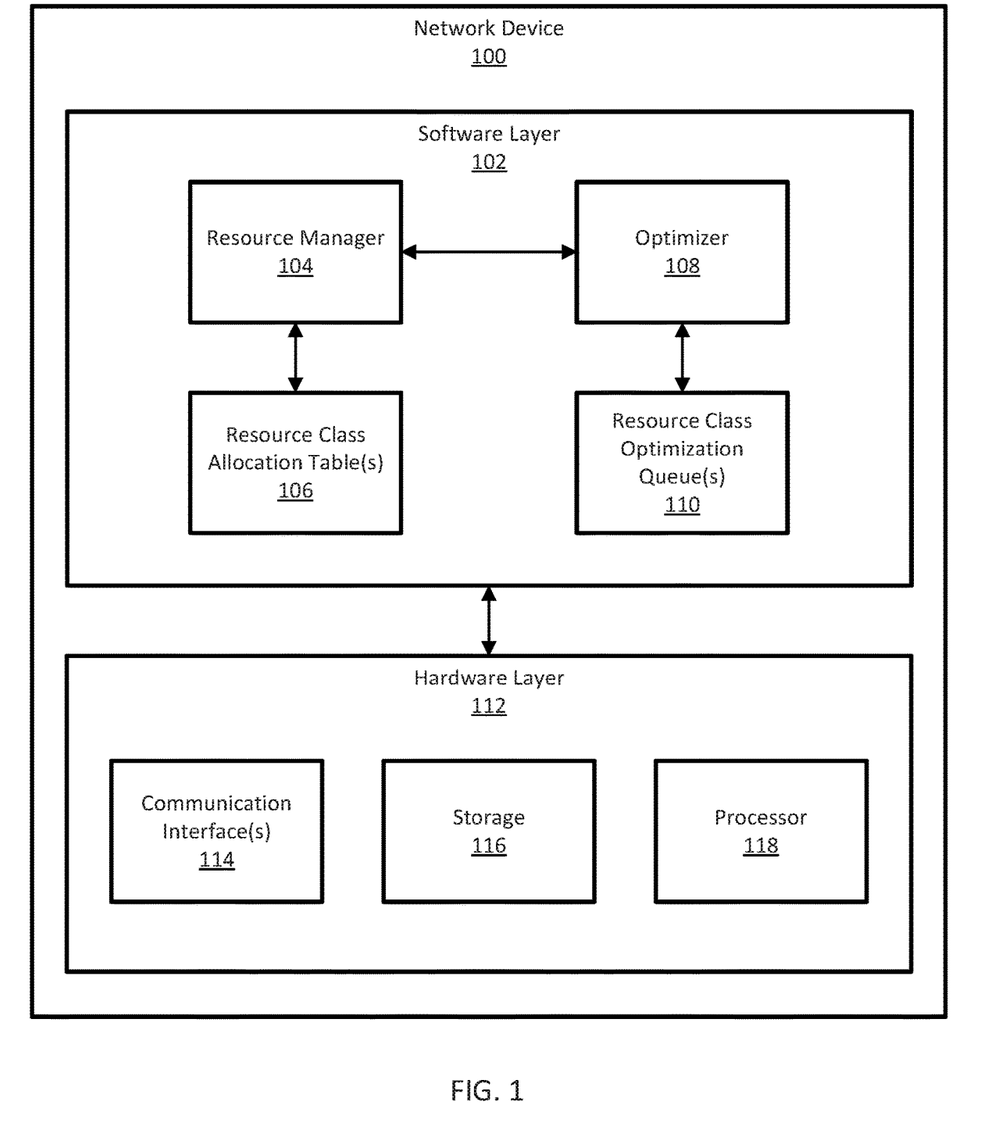
FIG. 1 shows a diagram of a network device, in accordance with one or more embodiments.

FIG. 1 shows a diagram of a system, in accordance with one or more embodiments. In one or more embodiments, a network device (e.g., network device (100)) is a physical device that includes hardware layer (112) with, at least, one or more communication interface(s) (114), storage (116), and processor (118). Further, in one or more embodiments, network device (100) may include software layer (102) that generally provides a virtual space in which software executes (e.g., an operating system, user space applications, etc.) and data structures are maintained (e.g., files, tables, metadata, etc.). Non-limiting examples of a network device include, but are not limited to, a network switch, a router, a multilayer switch, a fibre channel device, an InfiniBand® device, etc.

In one or more embodiments, a software layer (e.g., software layer (102)) is an abstract virtual environment in which software executes (i.e., initiates and/or performs operations using hardware layer (112) components, etc.) and data structures are maintained. That is, in one or more embodiments, although network device (100) may be a physical device that includes one or more hardware components, the logical operations performed by the hardware components of network device (100) may be conceptually identified as distinct entities (e.g., software instances) and grouped into a broader superset (i.e., software layer (102)). In one or more embodiments, software layer (102) includes resource manager (104), one or more resource class allocation table(s) (106), optimizer (108), and one or more resource class optimization queue(s) (110). Each of these components is described below.

In one or more embodiments, a resource manager (e.g., resource manager (104)) is software executing in software layer (102) that allocates usage of hardware layer (112) components (114, 116, 118) (e.g., "resources"), de-allocates usage of resources, and/or maintains one or more resource class allocation table(s) (e.g., resource class allocation table(s) (106)). In one or more embodiments, resource manager (104) is configured (i.e., programmed) to identify and track the utilization of resources and organize the usage of those resources (and/or some portion thereof) into resource allocation entries (not shown) of one or more resource class allocation table(s) (106). Further, in one or more embodiments, resource manager (104) is configured to communicate (e.g., exchange data, provide access to data, etc.) with an optimizer (108), including sending resource allocation entries and/or resource utilization data. A resource manager (e.g., resource manager (104)) may perform some or all of the method shown in FIG. 6.

In one or more embodiments, a "resource class" (e.g., "resource type" or "resource", generally) is a hardware component of a network device (e.g., network device (100)) that has limited utilization capacity and/or availability to one or more processes of the network device (e.g., network device (100)). Non-limiting examples of types of resource classes include, memory (e.g., random access memory (RAM), dynamic RAM (DRAM)), processors (e.g., integrated circuit devices for processing software instructions), non-volatile storage (e.g., hard disk drives (HDD), solid-state drives (SSD)), and/or any other component that has dynamic and finite availability within a network device.

In one or more embodiments, a resource class allocation table (e.g., resource class allocation table(s) (106)) is a data structure that includes one or more resource allocation entry(ies) (not shown). In one or more embodiments, a resource class allocation table is unique to one resource class. As a non-limiting example, resource class allocation table (106) may be associated exclusively with tracking memory usage (where 'memory' is the "resource class"). As another non-limiting example, resource class allocation table (106) may be associated exclusively with tracking processor usage (where 'processor(s)' are the "resource class"). Accordingly, in one or more embodiments, multiple resource class allocation tables (e.g., resource class allocation table(s) (106)) may exist, where each resource class allocation table is uniquely and independently associated with a different resource class. More details regarding resource class allocation tables (e.g., resource class allocation table(s) (106)) are discussed in the description of FIG. 2.

In one or more embodiments, an optimizer (e.g., optimizer (108)) is software executing in software layer (102) that communicates with resource manager (104), initiates an optimization process, and/or maintains one or more resource class optimization queue(s) (e.g., resource class optimization queue(s) (110)). In one or more embodiments, optimizer (108) is configured to receive resource allocation entries from resource manager (104) and analyze the data therein. Then, based on that analysis, place and/or remove a resource optimization entry (not shown) in a resource class optimization queue (e.g., resource class optimization queue(s) (110)). Further, optimizer (108) may receive and analyze resource utilization data to determine when to start and stop an optimization process. An optimizer (e.g., optimizer (108)) may perform some or all of the method shown in FIGS. 4-5.

In one or more embodiments, a resource class optimization queue (e.g., resource class optimization queue(s) (110)) is a data structure that includes one or more resource optimization entry(ies) (not shown). As a non-limiting example, resource class optimization queue (110) may be associated exclusively with tracking memory usage (where 'memory' is the "resource class").

As another non-limiting example, resource class optimization queue (110) may be associated exclusively with tracking processor usage (where 'processor(s)' are the "resource class"). Accordingly, in one or more embodiments, multiple resource class optimization queues (e.g., resource class optimization queue(s) (110)) may exist, where each resource class optimization queue is uniquely and independently associated with a different resource class. More details regarding a resource class optimization queue (e.g., resource class optimization queue(s) (110)) are discussed in the description of FIG. 3.

In one or more embodiments, a hardware layer (e.g., hardware layer (112)) is a collection of physical components configured to perform the operations of network device (100) and/or otherwise execute the software of network device (100) (e.g., resource manager (104), optimizer (108)). In one or more embodiments, hardware layer (112) includes communication interface(s) (114), storage (116), and processor (118). Each of these components is described below.

In one or more embodiments, a communication interface (e.g., communication interface(s) (114)) is a hardware component that provides capabilities to interface a network device (e.g., network device (100)) with one or more devices (e.g., a client, another network device, etc.) and allow for the transmission and receipt of data with those devices. Communication interface(s) (114) may communicate via any suitable form of wired interface (e.g., Ethernet, fiber optic, serial communication etc.) and/or wireless interface and utilize one or more protocols for the transmission and receipt of data (e.g., Transmission Control Protocol (TCP)/Internet Protocol (IP), Remote Direct Memory Access (RDMA), Institute of Electrical and Electronics Engineers (IEEE) 801.11, etc.).

In one or more embodiments, storage (e.g., storage (116)) is one or more hardware devices capable of storing digital information (e.g., data) in a non-transitory medium. Non-limiting examples of storage (116) include integrated circuit storage devices (e.g., solid-state drive (SSD), Non-Volatile Memory Express (NVMe), flash memory, random access memory (RAM), dynamic RAM (DRAM), resistive RAM (ReRAM), etc.), magnetic storage (e.g., hard disk drive (HDD), floppy disk, tape, diskette, etc.), or optical media (e.g., compact disc (CD), digital versatile disc (DVD), etc.).

In one or more embodiments, storage (116) may include one or more devices designated as "memory". In one or more embodiments, and as used herein, "memory" refers to storage (116) that provides access to data with less latency than other forms of storage. Further, in one embodiment, software (e.g., resource manager (104), optimizer (108)) executing on the network device (100) may use memory to temporarily store and manipulate data before persisting that data back into other storage devices. One of ordinary skill in the art, having the benefit of this detailed description, would appreciate that memory is a variant (or subset) of storage (116) that provides network device (100) the ability to access and manipulate data with less latency.

In one or more embodiments, a processor (e.g., processor (118)) is an integrated circuit for processing instructions (e.g., those of software layer (102) software, resource manager (104), optimizer (108), operating system software (not shown), etc.) and/or those received via a communication interface (e.g., communication interface(s) (114)). In one embodiment, a processor (118) may be one or more processor cores or processor micro-cores.

While FIG. 1 shows a specific configuration of a network device (e.g., network device (100)), other configurations may be used without departing from the scope. Accordingly, embodiments disclosed herein should not be limited to the configuration of devices and/or components shown in FIG. 1.

Figure 2:
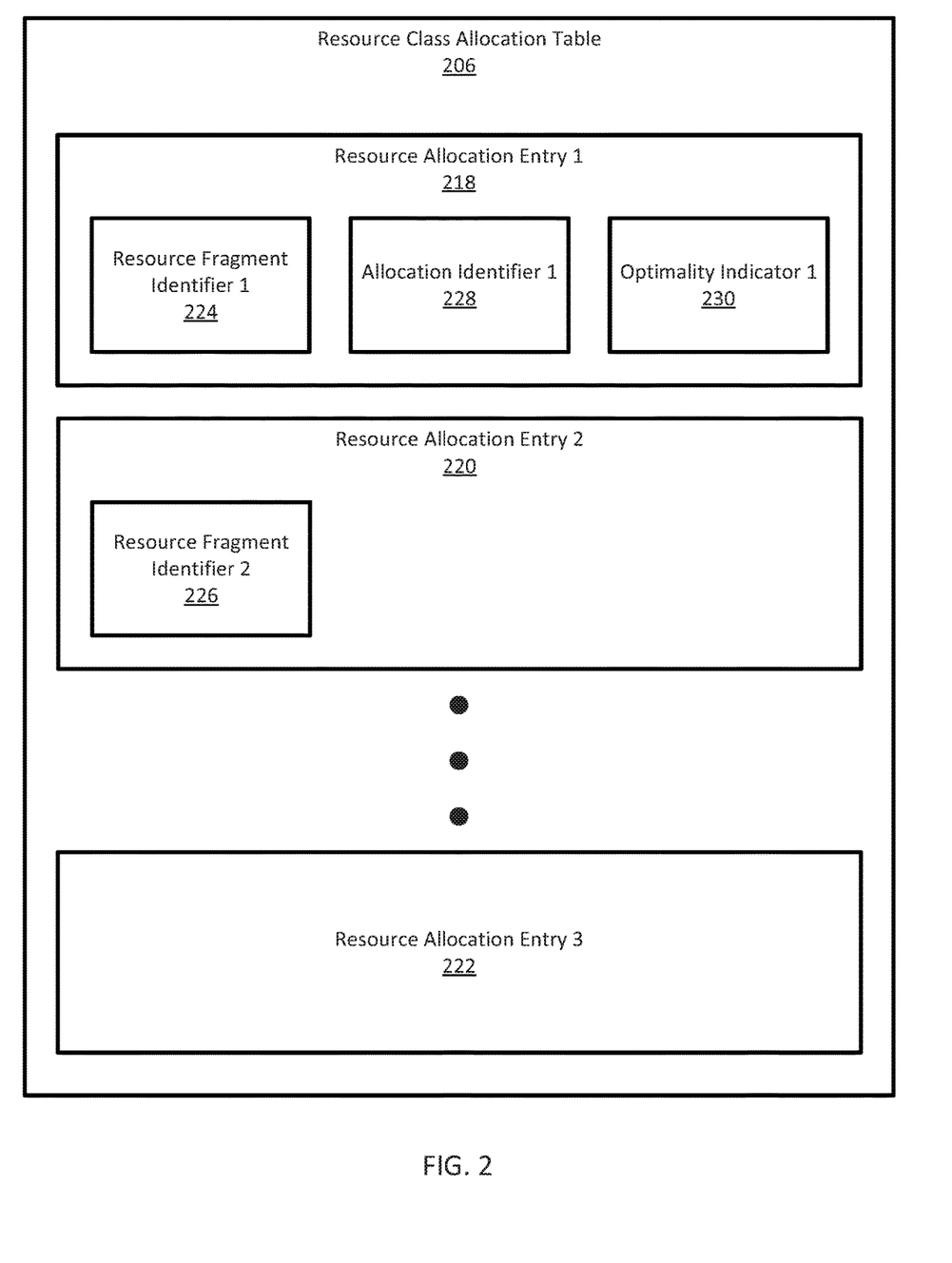
FIG. 2 shows a diagram of a resource class allocation table, in accordance with one or more embodiments.

FIG. 2 shows a diagram of a resource class allocation table, in accordance with one or more embodiments. In one or more embodiments, a resource class allocation table (e.g., resource class allocation table (206)) is a data structure that includes one or more resource allocation entry(ies) (e.g., resource allocation entry 1 (218), resource allocation entry 2 (220), resource allocation entry 3 (222)) and provides a centralized repository that may be used by one or more software entities (e.g., a resource manager and/or an optimizer) to measure resource utilization and identify what those resources are allocated to.

In one or more embodiments, a resource allocation entry (e.g., 218, 220, 222) is a data structure that includes a resource fragment identifier (e.g., resource fragment identifier 1 (224), resource fragment identifier 2 (226)), an allocation (e.g., allocation 1 (228)), and/or an optimality indicator (e.g., optimality indicator 1 (230)). Each of these components is described below. Further, in one or more embodiments, a resource allocation entry (e.g., 218, 220, 222) associates a resource fragment identifier (e.g., 224, 226) with an allocation (e.g., allocation 1 (228)) and an optimality indicator (e.g., optimality indicator 1 (230)) by virtue of being included in the same resource allocation entry (e.g., 218, 220, 222). As a non-limiting example, as shown in FIG. 2, resource fragment identifier 1 (224) is associated with allocation 1 (228) and optimality indicator 1 (230) as each of these are included in the same resource allocation entry (i.e., resource allocation entry 1 (218)).

In one or more embodiments, a resource fragment identifier (e.g., resource fragment identifier 1 (224), resource fragment identifier 2 (226)) is an alphanumeric expression (e.g., data) associated with a resource fragment (e.g., a subset, fragment, and/or portion of a resource). In one embodiment, a resource fragment identifier (e.g., 224, 226) may be a string of text that uniquely identifies some portion of a resource (i.e., a "resource fragment") associated with the resource class allocation table (206). As a non-limiting example, if the 'resource' is the memory of the network device (being consumed, for example, by an ECMP table) a 'resource fragment' may be an address range corresponding to a region of that memory (e.g., a range of virtual or physical addresses that store the ECMP table data and/or one or more entries thereof). In turn, a 'resource fragment identifier' (e.g., 224, 226) may be a string of text describing that resource fragment by specifying, for example, the offset and length of that physical address range (e.g., "Mem_Offset_1220_Len_032"). As another non-limiting example, if the 'resource' is a processor of the network device, the 'resource fragment' may be a core of that processor, where the 'resource fragment identifier' (e.g.,

224, 226) describes that particular core (e.g., "proc2_core4"). One of ordinary skill in the art, having the benefit of this detailed description, would appreciate that a resource fragment identifier may be any alphanumeric expression that is unique to the associated resource fragment.

In one or more embodiments, an allocation identifier (e.g., allocation identifier 1 (228)) is an alphanumeric expression (e.g., data) that describes the data (and/or process that maintains the data) that is consuming a resource fragment. As a non-limiting example, if a region of memory (i.e., a "resource fragment") is consumed by an ECMP table entry, an allocation identifier may be "ECMP08_Entry0174" which indicates entry 174 of the ECMP08 table is consuming the region of memory specified by the resource fragment identifier (e.g., 224, 226) of the same resource allocation entry (e.g., 218, 220, 222).

As another non-limiting example, an allocation identifier may be "STP_port3" indicating that a spanning tree protocol (STP) process for port 3 is executing as a thread on a processor core (i.e., "resource fragment") specified by the resource fragment identifier (e.g., 224, 226) of the same resource allocation entry (e.g., 218, 220, 222).

In one or more embodiments, an optimality indicator (e.g., optimality indicator 1 (230)) is data that indicates whether the allocation specified by the allocation identifier (e.g., allocation identifier 1 (228)) is designated as "optimal" or "non-optimal" (e.g., "not optimal", "sub-optimal"). In one or more embodiments, optimality is an indication of the efficiency and/or capabilities of the allocation that is consuming the associated resource fragment. If an allocation is active and/or accurate, the allocation may be designated "optimal". Whereas, conversely, if the allocation is inactive and/or not accurate, the allocation may be designated "non-optimal". As a non-limiting example, a network route may become inactive and therefore not usable by the network device. In such an instance, an ECMP table entry specifying that network route becomes "non-optimal" as the usage of that route is no longer possible. Accordingly, a resource fragment (e.g., region of memory) used to store information relating to that network route is unnecessarily consumed with data (e.g., an ECMP table entry) and may potentially be de-allocated.

In one or more embodiments, an allocation may be designated as 'optimal' or 'non-optimal' by the software entity that created the allocation, or by the resource manager after the allocation is created (e.g., while the resource allocation entry is generated). In one or more embodiments, optimality indicator (230) may be a binary indication, which the optimizer is configured to identify as corresponding to an 'optimal' or 'non-optimal' state. As a non-limiting example, optimality indicator (230) may be a Boolean data type that indicates the binary state of the optimality (e.g., "true"/"on"/ "1" for 'optimal', "false"/"off"/"false" for 'non-optimal').

While FIG. 2 shows a specific configuration of a resource class allocation table (e.g., resource class allocation table (206)), other configurations may be used without departing from the scope. Accordingly, embodiments disclosed herein should not be limited to the configuration of devices and/or components shown in FIG. 2.

Figure 3:
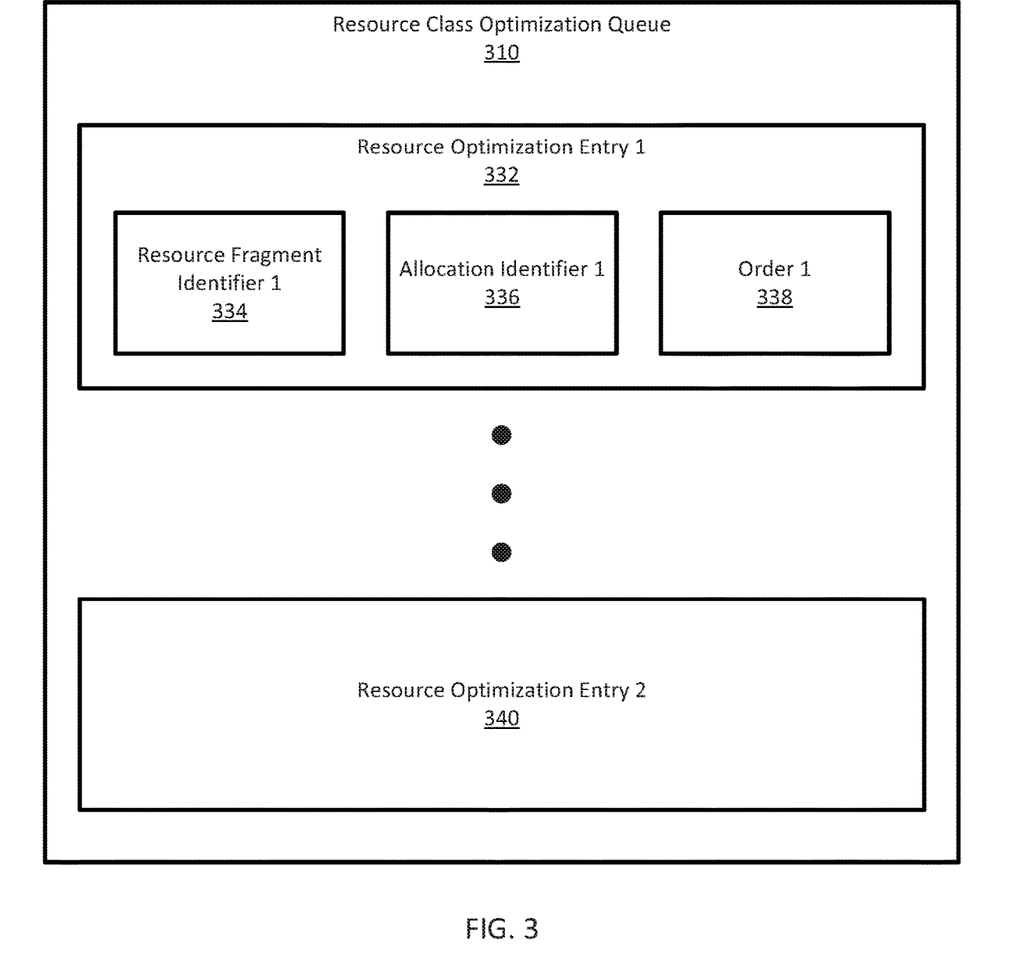
FIG. 3 shows a diagram of a resource class optimization queue, in accordance with one or more embodiments.

FIG. 3 shows a diagram of a resource class optimization queue, in accordance with one or more embodiments. In one or more embodiments, a resource class optimization queue (e.g., resource class optimization queue (310)) is a data structure that includes one or more resource optimization entry(ies) (e.g., resource optimization entry 1 (332), resource optimization entry 2 (340)). In one or more embodiments, resource class optimization queue (310) includes only resource optimization entries (332, 340) that are designated as "non-optimal" (and accordingly may have the resource fragments identified therein de-allocated to reduce resource utilization).

In one or more embodiments, a resource optimization entry (e.g., 332, 340) is a data structure that includes a resource fragment identifier (e.g., resource fragment identifier 1 (334)), an allocation (e.g., allocation 1 (336)), and/or an order (e.g., order 1 (338)). Each of these components is described below. In one or more embodiments, a resource optimization entry (e.g., 332, 340) associates a resource fragment identifier (e.g., resource fragment identifier 1 (334)) with an allocation (e.g., allocation 1 (336)) and an order (e.g., order 1 (338)) by virtue of being included in the same resource optimization entry (e.g., 332, 340). As a non-limiting example, as shown in FIG. 3, resource fragment identifier 1 (334) is associated with allocation 1 (336) and order 1 (338) because each exist within the same resource optimization entry (i.e., resource optimization entry 1 (332)).

In one or more embodiments, a resource fragment identifier (e.g., resource fragment identifier 1 (334)) has all of the same properties and purpose as discussed in the description of FIG. 2 (e.g., resource fragment identifier(s) (224, 226)). Similarly, in one or more embodiments, an allocation identifier (e.g., allocation identifier 1 (336)) has all of the same properties and the same purpose as discussed in the description of FIG. 2 (e.g., allocation 1 (228)).

In one or more embodiments, an order (e.g., order 1 (338)) is data indicating a logical comparative position of a resource optimization entry (e.g., 332, 340) within resource class optimization queue (310). As non-limiting examples, order (338) may be a numeric rank (e.g., "1", "6", "18") or an alphanumeric expression that specifies a time (i.e., a "timestamp").

In one or more embodiments, rank may be a comparative ordering with other resource optimization entries based on one or more factors (e.g., size of resource allocation, time, frequency of usage, designated importance, etc.). In one or more embodiments, a timestamp may specify the year, month, day, hour, minute, and/or second in numerical form (e.g., "20200323_143752" indicating Mar. 23, 2020 at 2:37:52 pm). Further, in one or more embodiments, a timestamp may specify a time zone (e.g., "Central Standard Time" (CST)) and/or additional smaller increments of time (e.g., centi-seconds, milliseconds, etc.). In one embodiment, a timestamp may measure time from a known offset other than year 0 AD (e.g., "Unix time" is measured in seconds from midnight Jan. 1, 1970 Coordinated Universal Time (UTC)). One of ordinary skill in the art, having the benefit of this detailed description, would appreciate that a timestamp may be any alpha, numeric, or alphanumeric expression that indicates a time.

While FIG. 3 shows a specific configuration of a resource class optimization queue (e.g., resource class optimization queue (310)), other configurations may be used without departing from the scope. Accordingly, embodiments disclosed herein should not be limited to the configuration of devices and/or components shown in FIG. 3.

Figure 4:
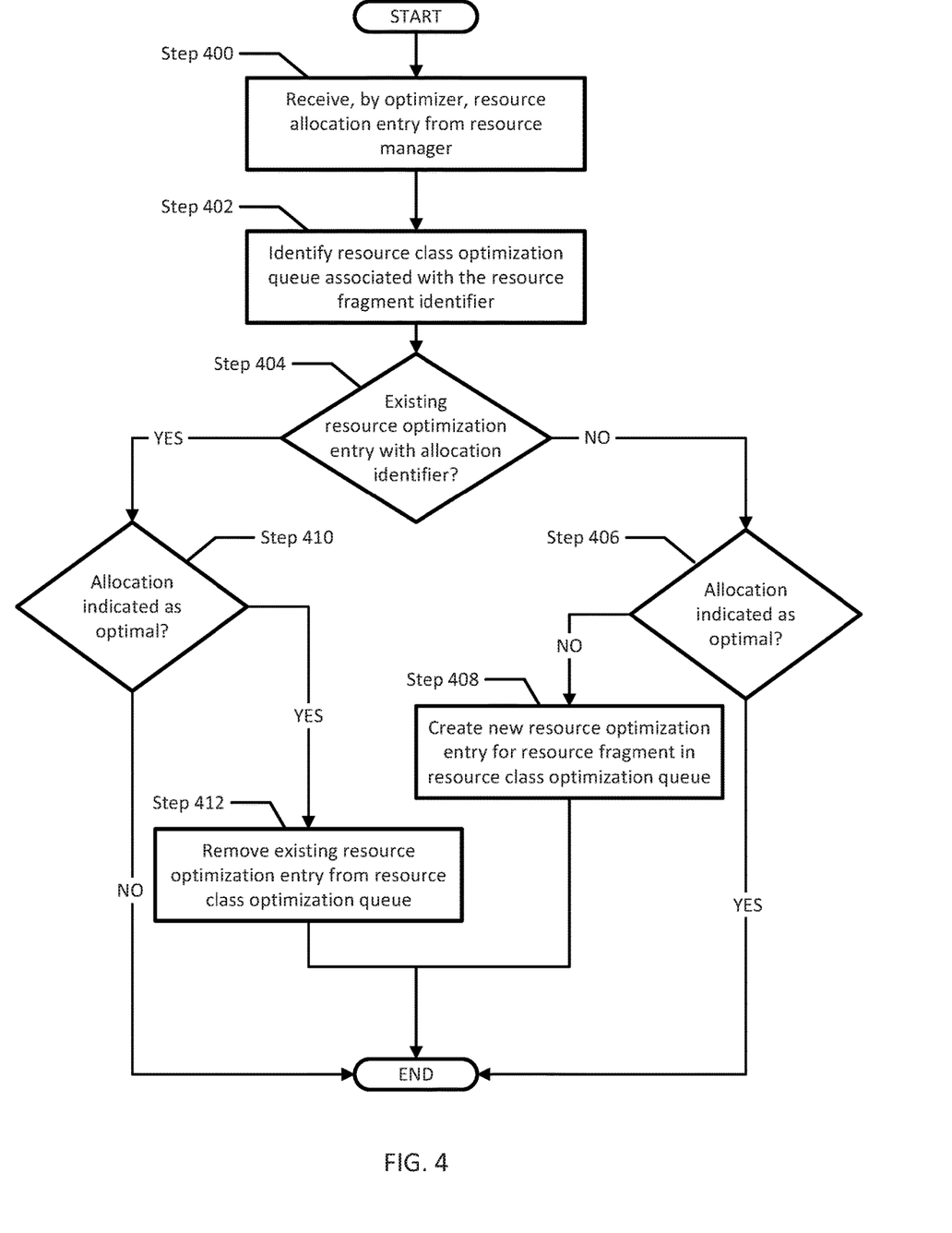
FIG. 4 shows a flowchart of a method of updating a resource class optimization queue, in accordance with one or more embodiments.

FIG. 4 shows a flowchart of a method of updating a resource class optimization queue, in accordance with one or more embodiments. All or a portion of the method shown in FIG. 4 may be performed by one or more components of the optimizer. However, another component of the system may perform this method without departing from this or other embodiments. While the various steps in this flowchart are presented and described sequentially, one of ordinary skill in the relevant art will appreciate that some or all of the steps may be executed in different orders, may be combined or omitted, and some or all steps may be executed in parallel.

In Step 400, an optimizer receives a resource allocation entry from the resource manager. In one or more embodiments, the resource manager sends the resource allocation entry to the optimizer after the resource manager generates and/or obtains the resource allocation entry. In one or more embodiments, the optimizer may access (i.e., read) the resource class allocation table and be configured to identify new resource allocation entries when added to the resource class allocation table. One of ordinary skill in the art having the benefit of this detailed description would appreciate that the optimizer is able to obtain a resource allocation entry using any suitable method for retrieving data.

In Step 402, the optimizer identifies the resource class optimization queue associated with the resource fragment identifier. In one or more embodiments, as a different resource class optimization queue exists for each type of resource, the optimizer identifies the particular resource class optimization queue associated with the resource specified by the resource fragment identifier in the resource allocation entry. In one or more embodiments, the optimizer may identify the resource class optimization queue by analyzing the resource fragment identifier and determining the type of resource based on the data thereof. As a non-limiting example, as discussed in the description of FIG. 2, the resource fragment identifier may be "Mem_Offset_1220_Len_032" which would indicate 'system memory' as the resource type and accordingly identify the resource class optimization queue associated with system memory. Similarly, in one or more embodiments, the optimizer may identify the associated resource class optimization queue based on the resource fragment identifier and the resource indicated therein.

In Step 404, the optimizer makes a determination about whether a resource optimization entry already exists (in the identified resource class optimization queue) that includes the same allocation identifier (and/or resource fragment identifier) as the resource allocation entry (received in Step 400). In one or more embodiments, to make the aforementioned determination, the optimizer searches existing resource optimization entries of the resource class optimization queue, if any, to identify a resource optimization entry that specifies the same allocation identifier (and/or resource fragment identifier) as the resource allocation entry received from the resource manager.

In one or more embodiments, as discussed in the description of FIG. 2, the allocation identifier may be, for example, "ECMP08_Entry0174". In such a non-limiting example, the optimizer searches each resource optimization entry of the identified resource class optimization queue for the same "ECMP08_Entry0174" allocation identifier. If the optimizer analyzes each existing resource optimization entry and fails to identify the same allocation identifier, the optimizer determines that the allocation is not present in the resource class optimization queue. However, if the optimizer identifies an allocation identifier of a resource optimization entry that includes the same allocation identifier, the optimizer stops searching the remaining resource optimization entries and positively determines that a resource optimization entry exists with the same allocation identifier as the resource allocation entry. Similarly, the optimizer may search the resource class optimization queue for a resource optimization entry that includes the same resource fragment identifier as the resource allocation entry received in Step 400.

Accordingly, if it is determined that the resource class optimization queue includes a resource optimization entry with the same allocation identifier (and/or resource fragment identifier) as the received resource allocation entry (404—YES), the method proceeds to Step 410. Alternatively, if it is determined that the resource class optimization queue does not include a resource optimization entry that specifies the same allocation identifier (and/or resource fragment identifier) (404—NO), the method proceeds to Step 406.

In Step 406, the optimizer makes a determination if the allocation of the resource allocation entry is indicated as optimal. In one or more embodiments, the resource allocation entry includes an optimality indicator that indicates whether the allocation (identified by the allocation identifier of the same resource allocation entry) is optimal or non-optimal. As discussed in the description of FIG. 2, the optimality indicator may be Boolean data (e.g., "true"/"false", "on"/"off", "1"/"0") that provides a binary indication of whether the identified allocation is considered 'optimal' or 'non-optimal'. In one or more embodiments, the optimizer determines whether the allocation is optimal by reading the optimality indicator of the resource allocation entry (received in Step 400).

If it is determined that the allocation is indicated as optimal (406—YES), the process ends. Alternatively, if it is determined that the allocation of the resource allocation entry is not indicated as optimal (i.e., "non-optimal") (406—NO), the method proceeds to Step 408.

In Step 408, the optimizer creates a new resource optimization entry in the resource class optimization queue for the resource fragment specified by the resource allocation entry. In one or more embodiments, as the allocation included in the resource allocation entry (received in Step 400) was determined to be non-optimal (Step 406—NO), the resource fragment is a candidate to be optimized, and therefore a new resource optimization entry is created for that resource fragment and allocation. In one or more embodiments, the created resource optimization entry includes a resource fragment identifier, an allocation identifier, and an order (as discussed in the description of FIG. 2). In one or more embodiments, the resource fragment identifier and allocation identifier of the new resource optimization entry are the same as included in the resource allocation entry received in Step 400.

In one or more embodiments, the optimizer may generate the order when creating the new resource optimization entry. As a non-limiting example, the optimizer may generate a timestamp indicating a time when the resource optimization entry is added to the resource class optimization queue. Further, in one or more embodiments, the optimizer may place the new resource optimization entry in the resource class optimization queue among existing resource optimization entries depending on the order (e.g., last, first, or somewhere in between the existing resource optimization entries).

In Step 410, the optimizer makes a determination if the allocation of the resource allocation entry is indicated as optimal. This step is substantially similar to process discussed in the description of Step 406. If it is determined that the allocation is indicated as optimal (Step 410—YES), the method proceeds to Step 412. Alternatively, if it is determined that the allocation of the resource allocation entry is not indicated as optimal (Step 410—NO), the process ends.

In Step 412, the optimizer removes the existing resource optimization entry from the resource class optimization queue. In one or more embodiments, as the allocation of the resource allocation entry (received in Step 400) was determined to be optimal (Step 404—YES), the resource fragment consumed by the allocation is no longer a candidate for optimization and, therefore, does not belong in the resource class optimization queue. Accordingly, in one or more embodiments, the resource optimization entry is removed from the resource class optimization queue so that if an optimization process begins, the resource fragment will not be de-allocated.

Figure 5:
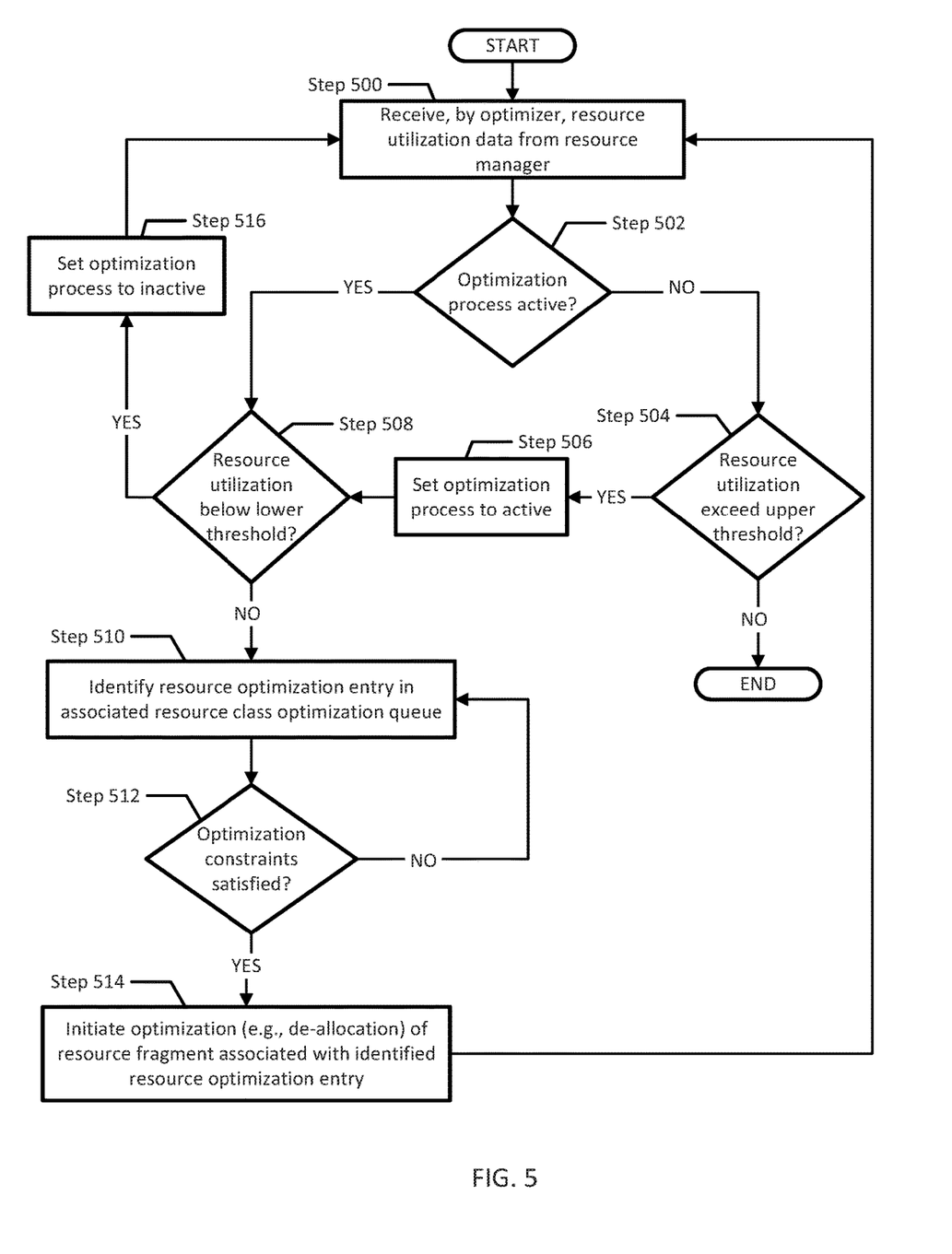
FIG. 5 shows a flowchart of a method of performing an optimization process, in accordance with one or more embodiments.

FIG. 5 shows a flowchart of a method of performing an optimization process, in accordance with one or more embodiments. All or a portion of the method shown in FIG. 5 may be performed by one or more components of the optimizer. However, another component of the system may perform this method without departing from this or other embodiments. While the various steps in this flowchart are presented and described sequentially, one of ordinary skill in the relevant art will appreciate that some or all of the steps may be executed in different orders, may be combined or omitted, and some or all steps may be executed in parallel.

In Step 500, an optimizer receives resource utilization data from a resource manager. In one or more embodiments, the resource manager may repeatedly transmit resource utilization data to the optimizer, and/or the optimizer may repeatedly query the resource manager for resource utilization data (and receive the resource utilization data in response to that querying).

In one or more embodiments, resource utilization data is data that specifies the utilization rate of a resource of the network device. As a non-limiting example, resource utilization data may be a percentage (e.g., 75%) of the resource that is consumed (i.e., allocated) and/or a measure of raw utilization (e.g., 31 Mb, 2.2 GHz, etc.).

In Step 502, the optimizer makes a determination about whether an optimization process is active. In one or more embodiments, the optimizer determines whether the optimization process is active by checking some known Boolean data (e.g., 1 or 0, on or off, true or false, etc.) that indicates the status of the optimization process. As a non-limiting example, the optimizer may be configured to read a data object (e.g., file, variable, property of a file object, entry of a table, etc.) that includes an "on" or "off" value indicating whether the optimizer process is active or inactive, respectively. One of ordinary skill in the art, having the benefit of this detailed description, would appreciate that any suitable variable data field may be used to store data indicating the binary activity status of a process.

If it is determined that the resource process is active (502—YES), the method proceeds to Step 508. Alternatively, if it is determined that the resource process is not active (i.e., inactive) (502—NO), the method proceeds to Step 504.

In Step 504, the optimizer makes a determination as to whether resource utilization, as indicated by the resource utilization data, exceeds an upper threshold. In one or more embodiments, the resource utilization data may provide a numerical value that the optimizer compares against an "upper threshold" value to determine about whether resource utilization is above that upper threshold. As a non-limiting example, in one or more embodiments, the resource utilization data may be a percentage (e.g., 93%) of the resource that is consumed (i.e., allocated) which is compared against an upper threshold also measured in percentage (e.g., 90%). Alternatively, as another non-limiting example, the resource utilization data may be a measure of raw utilization (e.g., 31 Mb) which is compared against an upper threshold measured in the same units (e.g., 30 Mb).

In one or more embodiments, the determination as to whether the resource utilization is "above" or "below" a threshold is made by comparing the resource utilization data value against a stored upper threshold value. If the resource utilization data value is greater than the upper threshold value, the resource utilization may be considered to be "above" and/or "exceed" the upper threshold. Conversely, if the resource utilization data value is less than the upper threshold value, the resource utilization may be considered to be "below" the upper threshold.

If it is determined that the resource utilization is above the upper threshold (504—YES), the method proceeds to Step 506. Alternatively, if it is determined that the resource utilization is below the upper threshold (504—NO), the process ends.

In Step 506, the optimizer sets the optimization process to active. In one or more embodiments, the optimizer sets the optimization process to active by modifying the Boolean data (described in Step 502) to indicate that the optimization process is active (i.e., setting/overwriting the data object with a "on", "true", or "1" value).

In Step 508, the optimizer makes a determination as to whether resource utilization, as indicated by the resource utilization data, is less than a lower threshold. In one or more embodiments, the resource utilization data provides a numerical value that the optimizer compares against a "lower threshold" value to determine if resource utilization is below that lower threshold. As a non-limiting example, in one or more embodiments, the resource utilization data may be a percentage (e.g., 63%) of the resource that is consumed (i.e., allocated) which is compared against a lower threshold also measured in percentage (e.g., 65%). Alternatively, as another non-limiting example, the resource utilization data may be a measure of raw utilization (e.g., 28 Mb) which is compared against a lower threshold measured in the same units (e.g., 24 Mb).

In one or more embodiments, the determination as to whether the resource utilization is "above" or "below" a threshold is made by comparing the resource utilization data value against a stored lower threshold value. If the resource utilization data value is less than the upper threshold value, the resource utilization may be considered to be "below" the lower threshold. Conversely, if the resource utilization data value is greater than the lower threshold value, the resource utilization may be considered to be "above" and/or "exceed" the lower threshold.

In one or more embodiments, two different thresholds (i.e., an "upper" threshold (Step 504) and a "lower threshold" (Step 508)) are separately utilized to determined when to start and stop the optimization process. Accordingly, by establishing two different thresholds, a hysteresis loop may be formed, where the optimization process remains active (until utilization falls below the lower threshold) despite a resource utilization rate that is below the upper threshold (that triggered the initiation of the optimization process). Further, by utilizing two thresholds, the optimization process is not frequently initiated and halted, as two disparate thresholds are separately utilized to control the start and stop of the process.

If it is determined that the resource utilization is below the lower threshold (508—YES), the method proceeds to Step 516. Alternatively, if it is determined that the resource utilization is above the lower threshold (508—NO), the process proceeds to Step 510.

In Step 510, the optimizer identifies a resource optimization entry in the resource class optimization queue (associated with the resource utilization data) to potentially be optimized. In one or more embodiments, the optimizer uses the "order" data (of one or more resource optimization entries) to identify a resource optimization entry.

As a non-limiting example, the optimizer may identify the oldest resource optimization entry currently in the resource class optimization queue (i.e., a first-in-first-out (FIFO) processing order). That is, in one or more embodiments, the "order" data of the resource optimization entry may be a timestamp that specifies a time at which the resource optimization entry was added to the resource class optimization queue. Thus, the optimizer may identify the resource optimization entry with the timestamp that specifies the earliest time among all of the resource optimization entries in the resource class optimization queue. As another non-limiting example, if the order for each resource optimization entry is a comparative rank, the optimizer may select the resource optimization entry with the highest (or lowest) rank for optimization. One of ordinary skill in the art, having the benefit of this detailed description, would appreciate that the order of each resource optimization entry in the resource class optimization queue may provide an overall ordering for each resource optimization entry.

In Step 512, the optimizer makes a determination about whether one or more constraints of the resource optimization entry are satisfied. In one or more embodiments, a constraint is logical condition that must be satisfied in order for a positive determination to be made (e.g., Step 512—YES). Non-limiting examples of a condition include a time threshold (e.g., a minimum "waiting period"), whether the identified allocations are associated with reserved resources, lowest comparative weighted rankings, and/or any other condition that may be placed on the processing of an allocation.

As a non-limiting example, in one or more embodiments, the optimizer may be programmed to require that any resource optimization entry exist for a certain minimum amount of time before having the resource fragment de-allocated. That is, if the order is a timestamp indicating a creation time of 14:33, the optimizer may enforce a constraint that a resource optimization entry must exist for a minimum of ten minutes before being optimized (i.e., requiring the current time to be, at least, 14:43). Thus, in one or more embodiments, the optimizer calculates the difference between the time specified in the timestamp and a current time to determine if the threshold minimum amount of time has passed.

In one or more embodiments, requiring each resource optimization entry to be in the resource class optimization queue for a minimum amount of time allows for efficient optimization allocations that may be considered "non-optimal" prematurely based on short term data. As a non-limiting example, for an ECMP table, some network routes may appear slow and inactive for only a brief period before regaining stable connectivity. Thus, during a minimum "waiting period", if the route is re-identified as 'optimal', the resource optimization entry can be removed from the resource class optimization queue and the resource fragment will not be de-allocated unnecessarily. Thus, by utilizing one or more embodiments disclosed herein, only the resources that consistently maintain 'non-optimal' associations are de-allocated; and further, routes that may repeatedly change status between 'optimal' and 'non-optimal' (within the specified "waiting period") are not repeatedly de-allocated and re-allocated as the minimum waiting period necessitates receiving and/or analyzing additional, longer-term data for those allocations.

Additionally, in one or more embodiments, a condition for processing a resource optimization entry may be that certain allocations associated with certain software processes should not be optimized. As a non-limiting example, one or more ECMP table entries may be considered to be more important (than other data consuming memory) and therefore should not be optimized (i.e., de-allocated). Accordingly, in one or more embodiments, even though a resource optimization entry is created and placed on the resource class optimization queue (based, at least partially, on a determination that the allocation is 'non-optimal'), the resource fragment may nonetheless remain allocated due to the determination that the resource optimization entry does not satisfy one or more conditions.

If it is determined that the resource optimization entry does not satisfy the constraints (512—NO), the method returns to Step 510. Alternatively, if it is determined that the resource optimization entry does satisfy the constraints (512—YES), the process proceeds to Step 510.

In Step 514, the optimizer initiates optimization of the resource fragment (identified by the resource fragment identifier of the resource optimization entry). In one or more embodiments, the optimizer initiates optimization of the resource fragment by sending, to the resource manager, a command to de-allocate the identified resource fragment. The command to de-allocate the resource fragment may include the resource fragment identifier and an instruction that the resource fragment should be de-allocated (and therefore freed for consumption by one or more other process and/or data of the network device).

Further, in one or more embodiments, the optimizer removes the resource optimization entry from the resource class optimization queue. After Step 514, the process proceeds back to Step 500 and the process continues to repeat (Step 500-514) until the resource utilization is determined to be below the lower threshold (Step 508—YES) and the optimization process is set to inactive (in Step 516).

In Step 516, the optimizer sets the optimization process to inactive. In one or more embodiments, the optimizer sets the optimization process to inactive by modifying the Boolean data (described in Step 502) to indicate that the optimization process is inactive (i.e., setting/overwriting the data object with an "off", "false", or "0" value).

In one or more embodiments, the process of FIG. 5 may be performed concurrently with the process of FIG. 4. That is, in one or more embodiments, new resource optimization entries may be added to the resource class optimization queue and/or existing resource optimization entries may be removed from the resource class optimization queue (FIG. 4) while one or more resource optimization entries are identified, instructed to be de-allocated, and removed from the resource class optimization queue (FIG. 5).

Figure 6:
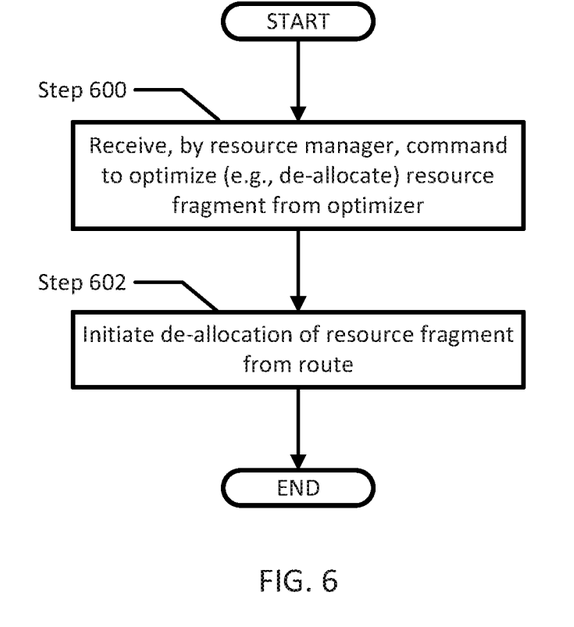
FIG. 6 shows a flowchart of a method of deallocating a resource fragment, in accordance with one or more embodiments.

FIG. 6 shows a flowchart of a method of deallocating a resource fragment, in accordance with one or more embodiments. All or a portion of the method shown in FIG. 6 may be performed by one or more components of the resource manager. However, another component of the system may perform this method without departing from this or other embodiments. While the various steps in this flowchart are presented and described sequentially, one of ordinary skill in the relevant art will appreciate that some or all of the steps may be executed in different orders, may be combined or omitted, and some or all steps may be executed in parallel.

In Step 600, a resource manager receives a command to optimize a resource fragment from the optimizer. In one or more embodiments, the command to optimize a resource fragment may include a resource fragment identifier, an allocation identifier, and/or an instruction that the resource fragment should be de-allocated.

In Step 602, in response to receiving the command to optimize a resource fragment, the resource manager initiates de-allocation of the resource fragment. In one or more embodiments, the resource manager initiates de-allocation of the resource fragment specified by the resource fragment identifier (received from the optimizer at Step 600). Specifically, in one or more embodiments, the resource manager de-allocates the resource fragment (e.g., some portion of memory, storage, processor core) by modifying that resource fragment to indicate that the resource fragment is free to be utilized by another process and/or other data. Further, in one or more embodiments, the resource manager removes the resource allocation entry, from the associated resource class allocation table, that includes the same resource fragment identifier (and/or allocation identifier) included in the command received from the optimizer.

Figure 7:
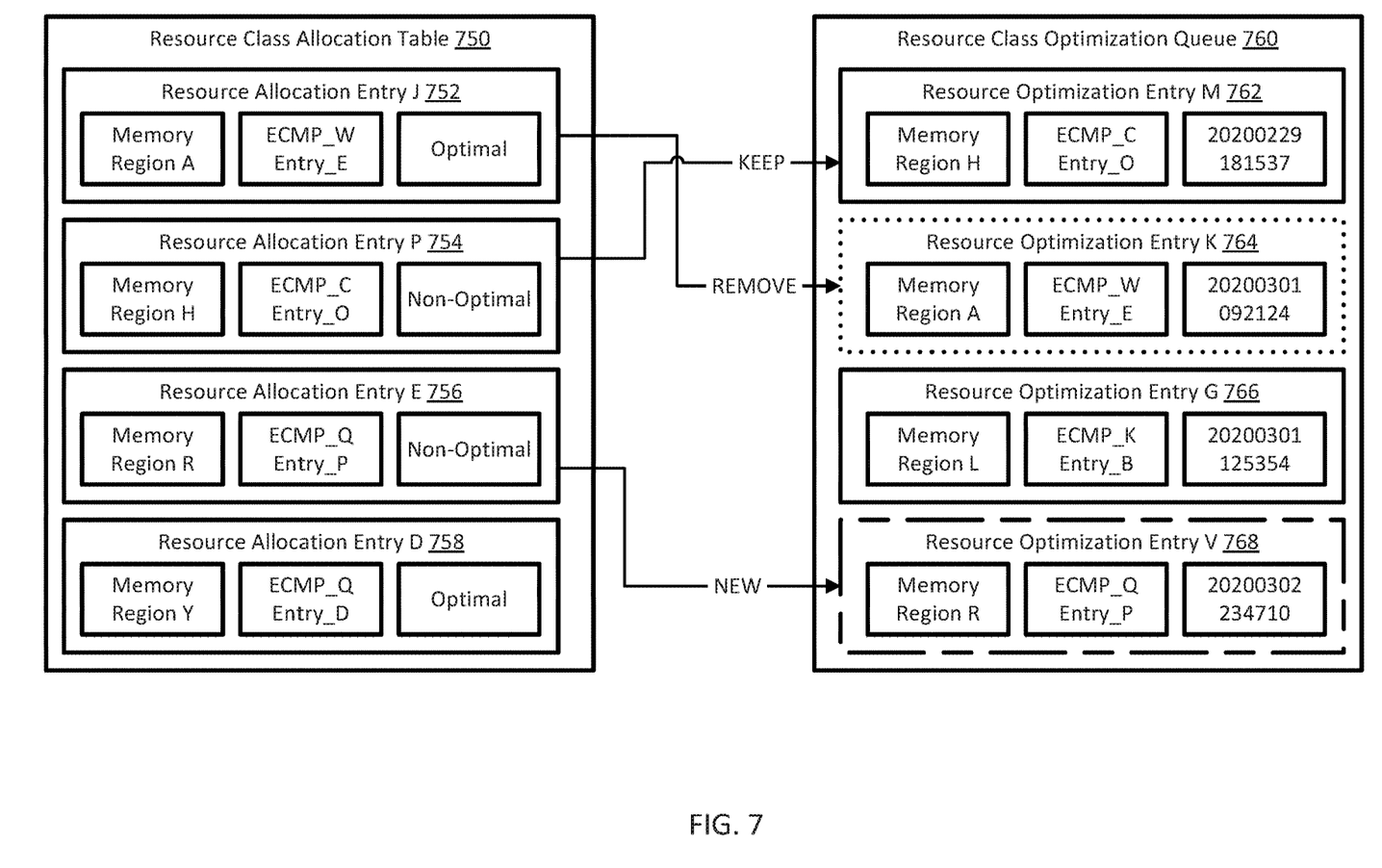
FIG. 7 shows an example, in accordance with one or more embodiments.

FIG. 7 shows an example, in accordance with one or more embodiments. The following use case is for explanatory purposes only and not intended to limit the scope to this embodiment. FIG. 7 shows an example resource class allocation table (750) as maintained by a resource manager (not shown), and a resource class optimization queue (760) as maintained by an optimizer (not shown).

In FIG. 7, consider a first scenario where the optimizer receives resource allocation entry J (752), of resource class allocation table (750), from a resource manager (e.g., Step 400). Further, resource allocation entry J (752) includes a resource fragment identifier specifying "Memory Region A", an allocation identifier specifying "ECMP_W_Entry_E", and an optimality indicator indicating that the allocation is "optimal". Subsequently, the optimizer identifies resource class optimization queue (760) as the resource class optimization queue associated with the resource fragment identifier (i.e., the resource class optimization queue associated with "memory") (e.g., Step 402). Then, the optimizer searches resource class optimization queue (760) to identify if the same allocation identifier is already specified in an existing resource optimization entry. Here, the optimizer determines that resource optimization entry K (764) includes the same allocation identifier ("ECMP_W_Entry_E") as resource allocation entry J (752) (e.g., Step 404—YES). After resource optimization entry K (764) is identified, the optimizer then determines that resource allocation entry J (752) includes an optimality indicator that indicates that the allocation is "optimal" (Step 410—YES). Accordingly, the optimizer removes resource optimization entry K (764) from resource class optimization queue (760) (e.g., Step 412).

In FIG. 7, consider a second scenario where the optimizer receives resource allocation entry P (754), of resource class allocation table (750), from a resource manager (e.g., Step 400). Further, resource allocation entry P (754) includes a resource fragment identifier specifying "Memory Region H", an allocation identifier specifying "ECMP_C_Entry_O", and an optimality indicator indicating that the allocation is "non-optimal". Subsequently, the optimizer identifies resource class optimization queue (760) as the resource class optimization queue associated with the resource fragment identifier (i.e., the resource class optimization queue associated with "memory") (e.g., Step 402). Then, the optimizer searches resource class optimization queue (760) to identify if the same allocation identifier is already specified in an existing resource optimization entry. Here, the optimizer determines that resource optimization entry M (762) includes the same allocation identifier ("ECMP_C_Entry_O") as resource allocation entry P (754) (e.g., Step 404—YES). After resource optimization entry M (762) is identified, the optimizer then determines that resource allocation entry P (754) includes an optimality indicator that indicates that the allocation is "non-optimal" (Step 410—NO). Accordingly, the optimizer leaves resource optimization entry M (762) in resource class optimization queue (760) (e.g., Step 412). Further, resource optimization entry M (762) maintains the same order, timestamp "20200229_181537", as originally generated when previously added to resource class optimization queue (760) by the optimizer.

In FIG. 7, consider a third scenario where the optimizer receives resource allocation entry E (756), of resource class allocation table (750), from a resource manager (e.g., Step 400). Further, resource allocation entry E (756) includes a resource fragment identifier specifying "Memory Region R", an allocation identifier specifying "ECMP_Q_Entry_P", and an optimality indicator indicating that the allocation is "non-optimal". Subsequently, the optimizer identifies resource class optimization queue (760) as the resource class optimization queue associated with the resource fragment identifier (i.e., the resource class optimization queue associated with "memory") (e.g., Step 402). Then, the optimizer searches resource class optimization queue (760) to identify if the same allocation identifier is already specified in an existing resource optimization entry. Here, the optimizer determines that no existing resource optimization entry in resource class optimization queue (760) includes the same allocation identifier ("ECMP_Q_Entry_P") as resource allocation entry P (754) (e.g., Step 404—NO). Further, after the optimizer determines that a corresponding resource optimization entry does not exist, the optimizer then determines that resource allocation entry E (756) includes an optimality indicator that indicates that the allocation is "non-optimal" (e.g., Step 406—NO). Accordingly, the optimizer newly creates resource optimization entry V (768) in resource class optimization queue (760) (e.g., Step 408). When creating resource optimization entry V (768), the optimizer includes the same resource fragment identifier and allocation as specified in resource allocation entry E (756), "Memory Region R" and "ECMP_Q_Entry_P", respectively. Further, the optimizer also generates and adds an order to resource optimization entry V (768); specifically, a timestamp specifying the date and time of creation "20200302_234710".

In FIG. 7, consider a fourth scenario where the optimizer receives resource allocation entry D (758), of resource class allocation table (750), from a resource manager (e.g., Step 400). Further, resource allocation entry D (758) includes a resource fragment identifier specifying "Memory Region Y", an allocation identifier specifying "ECMP_Q_Entry_D", and an optimality indicator indicating that the allocation is "optimal". Subsequently, the optimizer identifies resource class optimization queue (760) as the resource class optimization queue associated with the resource fragment identifier (i.e., the resource class optimization queue associated with "memory") (e.g., Step 402). Then, the optimizer searches resource class optimization queue (760) to identify if the same allocation identifier is already specified in an existing resource optimization entry. Here, the optimizer determines that no existing resource optimization entry in resource class optimization queue (760) includes the same allocation identifier ("ECMP_Q_Entry_D") as resource allocation entry D (758) (e.g., Step 404—NO). After the optimizer determines that a corresponding resource optimization entry does not exist, the optimizer then determines that resource allocation entry D (758) includes an optimality indicator that indicates that the allocation is "optimal" (e.g., Step 406—YES). Accordingly, the optimizer does not create a new resource optimization entry in resource class optimization queue (760) corresponding to resource allocation entry D (758).

Figure 8:
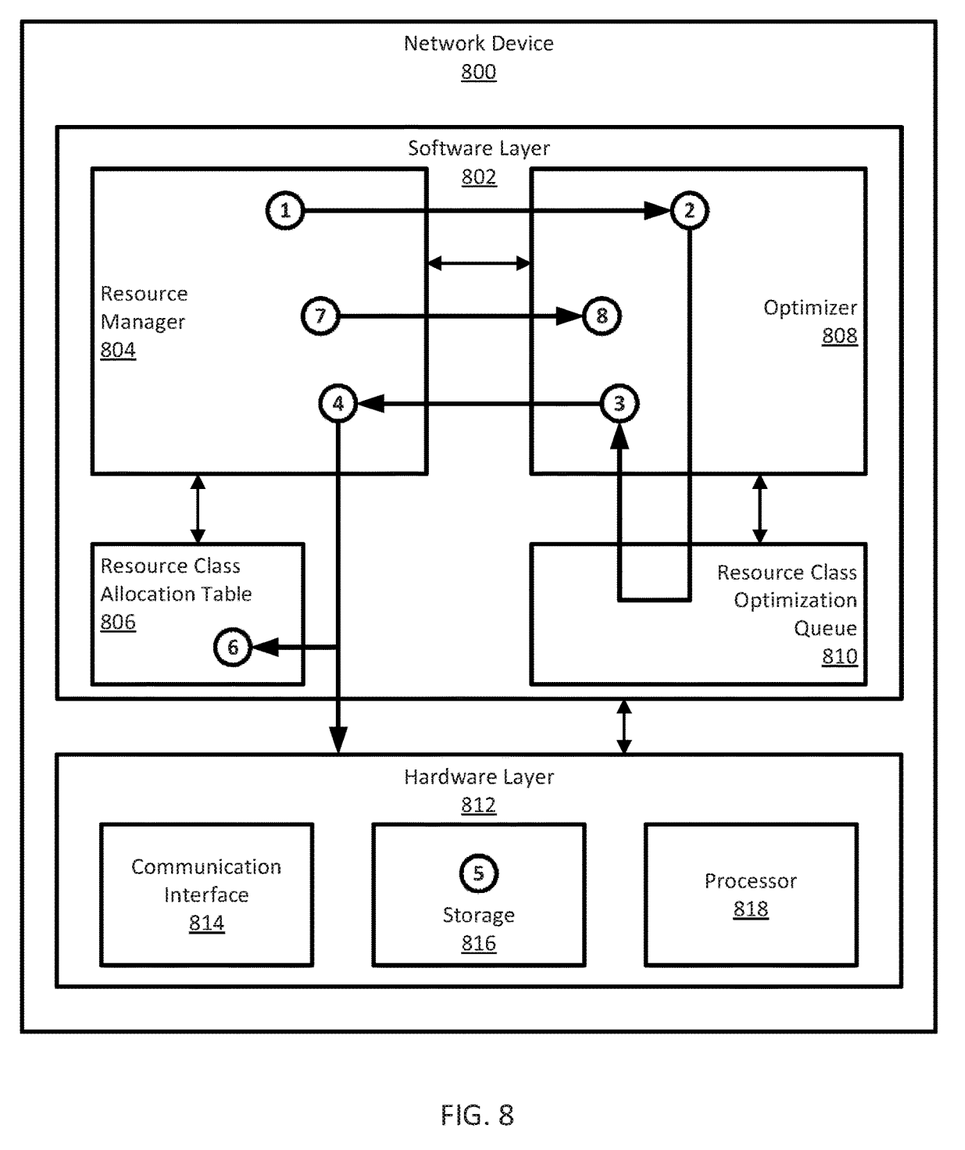
FIG. 8 shows an example, in accordance with one or more embodiments.

FIG. 8 shows an example, in accordance with one or more embodiments. The following use case is for explanatory purposes only and not intended to limit the scope to this embodiment. In FIG. 8, consider a scenario in which, network device (800) includes software layer (802), resource manager (804), resource class allocation table (806), optimizer (808), resource class optimization queue (810), hardware layer (812), communication interface (814), storage (816), and processor (818).

At (1), resource manager (804) sends resource utilization data to optimizer (808). At (2), optimizer (808) receives the resource utilization data (e.g., Step 500) and makes the determination that an optimization process is not active by reading a data object that specifies the optimization process if off (e.g., reads a binary indication "false" for the process status) (e.g., Step 502—NO). In response, optimizer (808) makes a determination that the resource utilization data specifies a value that exceeds an upper threshold (e.g., Step 504—YES).

Then, based on the determination that the resource utilization data exceeds an upper threshold, optimizer (808) sets the optimization process to "active" by modifying the optimization process data object to indicate the process is ongoing (e.g., modifying the value to "true") (e.g., Step 506). Optimizer (808) then determines that the resource utilization data is greater than a lower threshold (e.g., Step 508—NO) and proceeds to identify a resource optimization entry of the resource class optimization queue (810) (e.g., Step 510). Once a resource optimization entry is identified, optimizer (808) determines that the resource optimization entry satisfies a "waiting period" constraint that requires that a resource optimization entry must be present in resource class optimization queue (810) for at least three minutes prior to being optimized. Accordingly, optimizer (808) determines that the timestamp of the identified resource optimization entry specifies a time more than three minutes previous to the current time—therefore satisfying the constraint (e.g., Step 512—YES).

At (3), optimizer (808) initiates optimization of the resource fragment specified in the identified resource optimization entry (e.g., Step 514). Optimizer (808) initiates optimization by sending a command to resource manager (804) that includes the resource fragment identifier and an instruction that the resource fragment should be de-allocated. At (4), resource manager (804) initiates de-allocation of the resource fragment specified by the resource fragment identifier. Specifically, at (5), resource manager (804) de-allocates some portion of storage (816) by modifying storage (816) to indicate that the portion of storage specified by the resource fragment identifier is now free to be utilized by another process for other data. Further, at (6), resource manager (804) removes the resource allocation entry from resource class allocation table (806) that includes the same resource fragment identifier included in the command received from optimizer (808).

At (7), like at (1), resource manager (804) sends resource utilization data to optimizer (808). However, as a region of storage (816) was de-allocated (at (5)), the resource utilization data includes a lower utilization value than previously sent (at (1)). At (8), optimizer (808) receives the resource utilization data (e.g., Step 500) and makes the determination that an optimization process is ongoing by reading the data object that specifies the optimization process is active, as set at (2) (e.g., Step 502—YES). Optimizer (808) then determines that the resource utilization data is lower than a lower threshold (e.g., Step 508—YES). Accordingly, optimizer (808) sets the optimization process to "inactive" by modifying the data object to indicate the process is not ongoing (e.g., modifying the value to "false") (e.g., Step 516).

Further, assuming only incremental changes in the resource utilization, resource manager (804) may repeatedly send resource utilization data to optimizer (808) that does not exceed the resource utilization upper threshold (Step 504—NO), thereby ending the process until additional resource utilization data is received from resource manager (804) that surpasses the upper threshold (Step 504—YES).

As articulated above, specific embodiments are described with reference to the accompanying figures. In the preceding description, numerous details were set forth as examples. One of ordinary skill in the art, having the benefit of this detailed description, would appreciate that one or more embodiments described above may be practiced without the explicitly articulated details, and that numerous variations or modifications may be possible without departing from the scope. Certain details known to those of ordinary skill in the art may be omitted to avoid obscuring the description.

In the preceding description of the figures, any component described with regard to a figure, in various embodiments, may be equivalent to one or more like-named components shown and/or described with regard to any other figure. For brevity, descriptions of these components were not repeated with regard to each figure. Thus, each and every embodiment of the components of each figure is incorporated by reference and assumed to be optionally present within every other figure having one or more like-named components. Additionally, in accordance with various embodiments, any description of any component of a figure is to be interpreted as an optional embodiment, which may be implemented in addition to, in conjunction with, or in place of the embodiments described with regard to a corresponding like-named component in any other figure.

Throughout this application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired or wireless connection directly between two devices) or indirect (e.g., wired and/or wireless connections between any number of devices connecting the operatively connected devices) connection.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for managing optimization of network device resources, the method comprising:
    receiving a resource allocation entry that identifies a resource fragment;
    receiving an indication of whether the resource allocation entry is indicated as optimal;
    in response to receiving the indication that the resource allocation entry is indicated as optimal, removing from a resource class optimization queue that is a data structure stored in a memory of a network device any resource optimization entry associated with the resource fragment; and
    in response to receiving the indication that the resource allocation entry is indicated as non-optimal, either maintaining an existing resource optimization entry associated with the resource fragment or adding a new resource optimization entry associated with the resource fragment in the resource class optimization queue.

2. The method of claim 1, further comprising performing an optimization of the resource fragment if any resource optimization entry associated with the resource fragment remains in the resource class optimization queue.

3. The method of claim 1, further comprising identifying the resource class optimization queue associated with the identifier associated with the resource fragment using an identifier of the resource fragment.

4. The method of claim 1, wherein the resource allocation entry is received from a resource manager of a network device.

5. The method of claim 1, wherein the resource allocation entry is received by an optimizer of a network device.

6. The method of claim 1, wherein the resource allocation entry comprises a resource fragment identifier, an allocation identifier, and an optimality indicator.

7. The method of claim 1, further comprising generating, by a network device optimizer, the indication of whether the resource allocation entry is indicated as optimal, the generating including:
    in response to determining that utilization of the resource fragment is below a lower threshold, generating the indication that the resource allocation entry is optimal; and
    in response to determining that utilization of the resource fragment exceeds an upper threshold, generating the indication that the resource allocation entry is non-optimal.

8. The method of claim 1, wherein the resource fragment comprises a fragment of a hardware resource of the network device.

9. A network device, comprising:
    memory; and
    a processor, wherein the processor is configured to perform a method for optimizing network device resources, comprising:
        receiving a resource allocation entry that identifies a resource fragment;
        receiving an indication of whether the resource allocation entry is indicated as optimal;
        in response to receiving the indication that the resource allocation entry is indicated as optimal, removing from a resource class optimization queue that is a data structure stored in a memory of a network device any resource optimization entry associated with the resource fragment; and
        in response to receiving the indication that the resource allocation entry is indicated as non-optimal, either maintaining an existing resource optimization entry associated with the resource fragment or adding a new resource optimization entry associated with the resource fragment in the resource class optimization queue.

10. The network device of claim 9, further comprising performing an optimization of the resource fragment if any resource optimization entry associated with the resource fragment remains in the resource class optimization queue.

11. The network device of claim 9, further comprising identifying the resource class optimization queue associated with the identifier associated with the resource fragment using an identifier of the resource fragment.

12. The network device of claim 9, wherein the resource allocation entry is received from a resource manager of a network device.

13. The network device of claim 9, wherein the resource allocation entry is received by an optimizer of a network device.

14. The network device of claim 9, wherein the resource allocation entry comprises a resource fragment identifier, an allocation identifier, and an optimality indicator.

15. A non-transitory computer readable medium comprising computer readable program code, which when executed by a computer processor enables the computer processor to perform a method for optimizing network device resources, comprising:
    receiving a resource allocation entry that identifies a resource fragment;
    receiving an indication of whether the resource allocation entry is indicated as optimal;
    in response to receiving the indication that the resource allocation entry is indicated as optimal, removing from a resource class optimization queue that is a data structure stored in a memory of a network device any resource optimization entry associated with the resource fragment; and
    in response to receiving the indication that the resource allocation entry is indicated as non-optimal, either maintaining an existing resource optimization entry associated with the resource fragment or adding a new resource optimization entry associated with the resource fragment in the resource class optimization queue.

16. The non-transitory computer readable medium of claim 15, the method further comprising performing an optimization of the resource fragment if any resource optimization entry associated with the resource fragment remains in the resource class optimization queue.

17. The non-transitory computer readable medium of claim 15, the method further comprising identifying the resource class optimization queue associated with the identifier associated with the resource fragment using an identifier of the resource fragment.

18. The non-transitory computer readable medium of claim 15, wherein the resource allocation entry is received from a resource manager of a network device.

19. The non-transitory computer readable medium of claim 15, wherein the resource allocation entry is received by an optimizer of a network device.

20. The non-transitory computer readable medium of claim 15, wherein the resource allocation entry comprises a resource fragment identifier, an allocation identifier, and an optimality indicator.

* * * * *